US011960112B2

(12) United States Patent
Onitsuka (10) Patent No.: US 11,960,112 B2
(45) Date of Patent: Apr. 16, 2024

(54) DECORATIVE LIGHTING DEVICE AND GAME MACHINE

(71) Applicant: OMRON CORPORATION, Kyoto (JP)

(72) Inventor: Hiroyuki Onitsuka, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/591,767

(22) Filed: Feb. 3, 2022

(65) Prior Publication Data

US 2022/0308282 A1    Sep. 29, 2022

(30) Foreign Application Priority Data

Mar. 26, 2021 (JP) ................. 2021-054237

(51) Int. Cl.
*F21V 8/00* (2006.01)
*F21V 7/00* (2006.01)
*F21W 121/00* (2006.01)

(52) U.S. Cl.
CPC .......... *G02B 6/0055* (2013.01); *F21V 7/0025* (2013.01); *G02B 6/0078* (2013.01); *F21W 2121/00* (2013.01)

(58) Field of Classification Search
CPC ... G02B 6/0055; G02B 6/0078; F21V 7/0025; F21W 2121/00
USPC ........................................................ 362/606
See application file for complete search history.

(56) References Cited

U.S. PATENT DOCUMENTS

| 2010/0002463 | A1* | 1/2010 | Choi ................. G02F 1/133555 362/609 |
| 2010/0188601 | A1* | 7/2010 | Onishi ................. G02B 6/0088 349/61 |
| 2010/0246200 | A1* | 9/2010 | Tessnow ............... F21S 43/243 362/509 |
| 2014/0226361 | A1* | 8/2014 | Vasylyev ............. G02B 6/0025 362/609 |
| 2015/0235508 | A1  | 8/2015 | Shinohara et al. |
| 2017/0139109 | A1* | 5/2017 | Gierens ............. B32B 17/10055 |
| 2020/0111295 | A1* | 4/2020 | Glenn .................. G02B 6/0018 |

FOREIGN PATENT DOCUMENTS

JP    2015-156317 A    8/2015

* cited by examiner

*Primary Examiner* — Jia X Pan
*Assistant Examiner* — Jessica M Apenteng
(74) *Attorney, Agent, or Firm* — METROLEX IP LAW GROUP, PLLC (57) ABSTRACT

It is an object of the present invention to provide a decorative lighting device and a game machine, with which the brightness of a light presentation can be increased and a light presentation with a more dramatic effect can be given even if the number of light sources is limited. A decorative lighting device (1), which has an elongated shape in the vertical direction and is installed on both sides of a game machine, comprises a case (2) in which at least the front and side surfaces of the device are open; a transparent cover (3) that covers the open portion of the case (2); a plurality of light guide plates (4S, 4M, 4L) that are housed inside the case (2) and are disposed spaced apart in the front-rear direction of the device, with each light emitting surface (4a) facing the front surface of the device; and a plurality of light sources provided corresponding to the plurality of light guide plates (4S, 4M, 4L).

7 Claims, 11 Drawing Sheets

DECORATIVE LIGHTING DEVICE AND GAME MACHINE

CROSS-REFERENCE TO RELATED APPLICATIONS

This application claims priority to Japanese Patent Application No. 2021-054237 filed on Mar. 26, 2021. The entire disclosure of Japanese Patent Application No. 2021-054237 is hereby incorporated herein by reference.

BACKGROUND

Technical Field

The present invention relates to a decorative lighting device and a game machine that perform a light presentation using light guide plates.

Description of the Related Art

There is a conventional technique in which light emitted from a light source is made to be incident on the inside from the end surface of a light guide plate, this light is reflected by dimples provided on the back surface of the light guide plate, and the light is emitted from the front surface (light emission surface) of the light guide plate. Game machines such as slot machines installed in casinos or other game arcades are equipped with a decorative lighting device using this technology. The applicant of the present application has also proposed a decorative lighting device that is favorably installed in a game machine (for example, Patent Literature 1). In a decorative lighting device such as this, the illumination pattern of the light guide plate is switched to produce a light presentation. Many different illumination patterns can be created by variously changing the combination of the emission color and the emission timing.

CITATION LIST

Patent Literature

Patent Literature 1: JP-A 2015-156317

SUMMARY

In a decorative lighting device such as this, the brightness of the light guide plate is important, and the higher is the brightness, the better will be the effect on the player, and the more the player will be attracted to the game machine. The brightness of the light guide plate can be increased by increasing the number of light sources, but this raises power consumption, so the brightness cannot be increased unduly.

It is an object of the present invention to provide a decorative lighting device and a game machine, with which the brightness of a light presentation can be increased and a light presentation with a more dramatic effect can be given, even if the number of light sources is limited.

The present invention employs the following configuration in order to solve the above problem.

That is, the decorative lighting device installed in a game machine according to one aspect of the present invention is a decorative lighting device that is installed in the housing of a game machine, comprising a case in which at least the front and side surfaces of the device are open; a transparent cover that covers the open portion of the case; a plurality of light guide plates that are housed inside the case and are disposed spaced apart in the front-rear direction of the device, with each light emitting surface facing the front surface of the device; and a plurality of light sources provided corresponding to the plurality of light guide plates.

With this configuration, the plurality of light guide plates are disposed in the front-rear direction of the device, with each light emitting surface facing the front of the device. With this layout, the light guide plates appear to be overlapping when viewed from the front of the device. This overlapping makes the light emitted from each light guide plate supplement the other light, the result being that a higher brightness can be obtained than that obtained by a single light guide plate in the overlapping portion.

Consequently, even if the brightness of each light guide plate cannot be increased due to a limitation on the number of light sources, the brightness of the light presentation can be increased by displaying a plurality of lit light guide plates in an overlapping manner, which affords a light presentation that has a more dramatic effect.

Furthermore, with the above configuration, since the light guide plates are disposed spaced apart, each of the light guide plates can be seen separately in the front-rear direction. This produces a sense of depth in the front-rear direction, and a light presentation with a sense of depth can be given by controlling each of the light guide plates.

In the decorative lighting device according to the above-mentioned aspect, the case and the cover may be formed in an elongated shape, and a plurality of sets made up of the plurality of light guide plates may be disposed in the elongation direction. With the above configuration, in an elongated decorative lighting device, a light presentation with movement in the elongation direction can be given by controlling each of the sets made up of a plurality of light guide plates disposed in the elongation direction.

In the decorative lighting device according to the above-mentioned aspect, the plurality of light guide plates may increase in size going from the front toward the rear. With this configuration, all of the light guide plates disposed in the front-rear direction can be seen from the front, so the presentation can be given over a greater width. In addition, a light presentation with a greater sense of depth can be achieved due to the perspective method.

In the decorative lighting device according to the above-mentioned aspect, the case may comprise a mirror unit having a light reflection function on an inner wall that demarcates a space in which the plurality of light guide plates are disposed. With this configuration, the light emitted from the back surface of the light guide plates and from the end surfaces of the outer peripheral portions of the light guide plates is reflected by the mirror unit. This makes it possible for a player or other user to see light that could not otherwise have be seen from the front and side surfaces of the device, and further enhances the presentation effect.

In the decorative lighting device according to the above-mentioned aspect, the cover may comprise a half mirror unit having a light reflection function and a light transmission function. With this configuration, the cover can be made to look like a mirror or to appear transparent, according to the brightness on the inside. This enhances the effect of the presentation.

In the decorative lighting device according to one aspect disclosed herein, the case can comprise a mirror unit having a light reflection function on an inner wall that demarcates a space in which the plurality of light guide plates are disposed, and the cover can comprise a half mirror unit having a light reflection function and a light transmission function.

With this configuration, the mirror unit provided to an inner wall and the half mirror unit provided to the cover constitute an infinity mirror. Consequently, in addition to the respective effects of the mirror unit and the half mirror unit described above, it is possible to create a light presentation with a fantastical sense of depth of light by means of the infinity mirror, in which the lit light guide plates are reflected over and over, and this further enhance the presentation effect.

The game machine according to one aspect disclosed herein has a game machine main body and the decorative lighting device according to any of the modes disclosed above, which is installed in the housing of the game machine main body.

(Effects)

With one mode of the present invention, it is possible to provide a decorative lighting device and a game machine with which a light presentation with a very dramatic effect can be given to a user, etc., who is located somewhere other than in front of the device.

With the present invention, it is possible to provide a decorative lighting device and a game machine with which the brightness of a light presentation is increased, which allows a light presentation with a more dramatic effect to be given even though the number of light sources is limited.

DETAILED DESCRIPTION

An embodiment relating to one aspect of the present invention (hereinafter, also referred to as "this embodiment") will be described with reference to the drawings.

This embodiment illustrates a decorative lighting device that is installed on the left and right edge portions of the front surface of a game machine.

§ 1 Application Example

Figure 1:
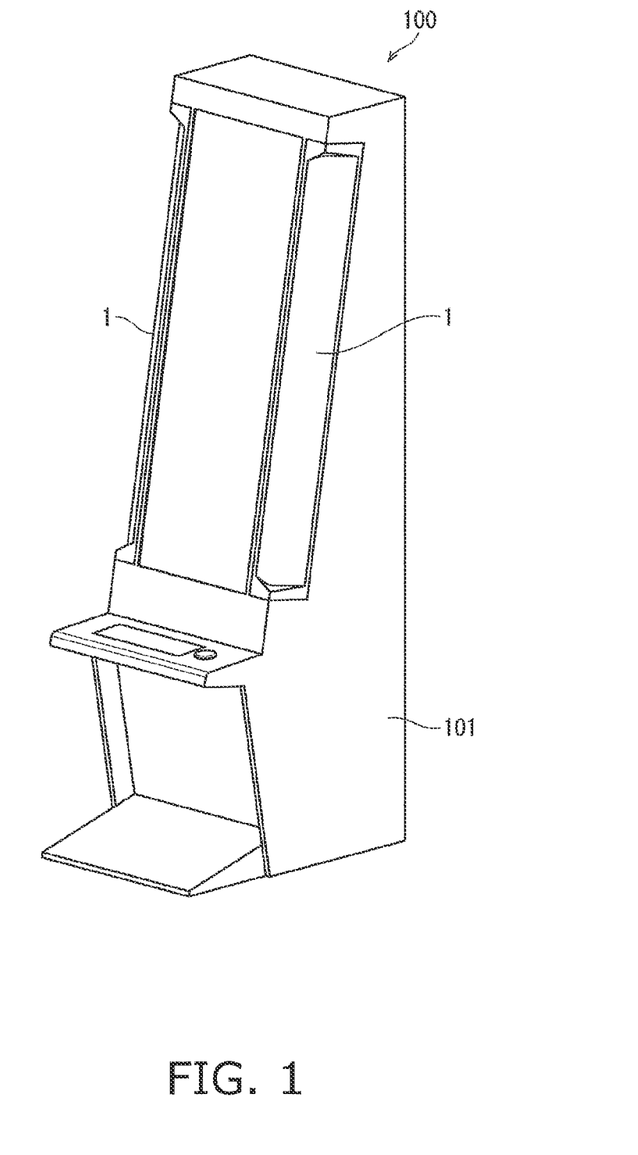
FIG. 1 is an oblique view of an example of a game machine equipped with the decorative lighting device according an embodiment.
Figure 2:
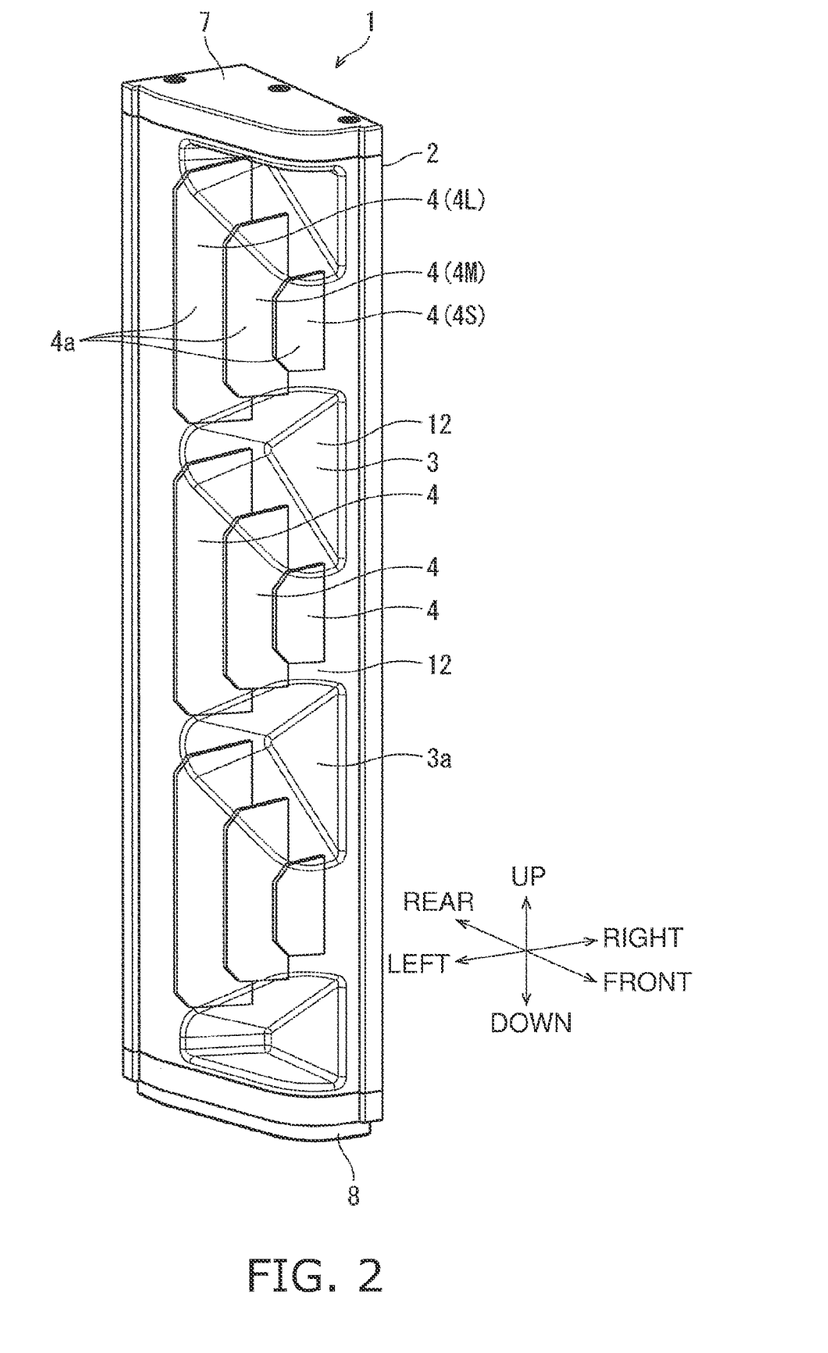
FIG. 2 is an oblique view of the decorative lighting device according to an embodiment.

As shown in FIG. 1, the decorative lighting device 1 according to this embodiment has an elongated shape that is longer in the vertical direction, and is installed on the left and right edges of the front surface of a housing 101 of a game machine 100, such as a slot machine. As shown in FIG. 2, the decorative lighting device 1 comprises a case 2 having at least its front and side surfaces open, a cover 3 that covers the open portion of the case 2, and a plurality of light guide plates 4 that are disposed inside the case 2. The light guide plates 4 are disposed so as to be spaced apart from each other in the front-rear direction, with the light emitting surfaces 4a facing the front. In the example in FIG. 2, three light guide plates 4S, 4M, and 4L are disposed in the front-rear direction, and three sets each made up of the three light guide plates 4S, 4M, and 4L are disposed in the vertical direction.

Figure 6:
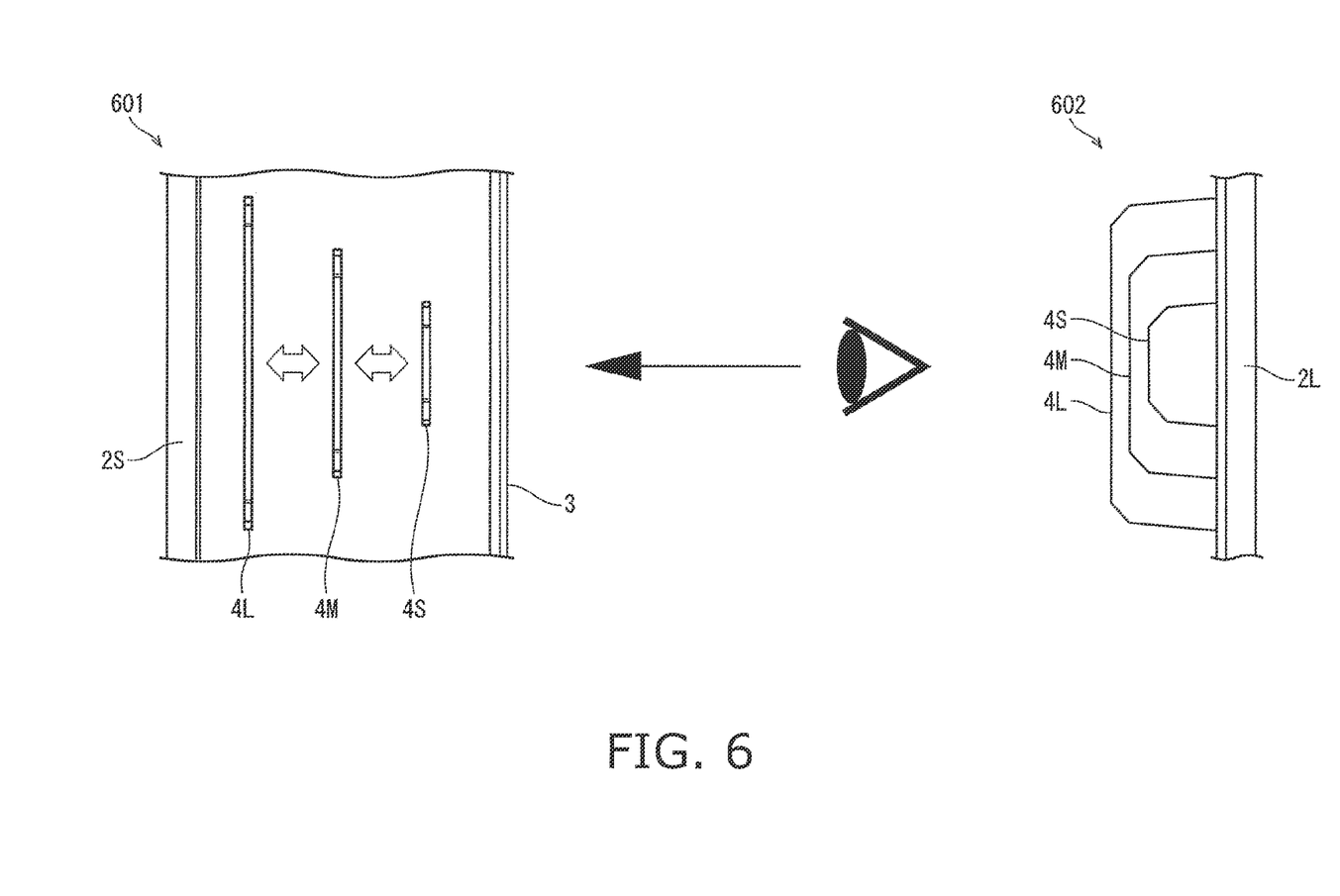
FIG. 6 is a diagram illustrating a presentation effect produced by supplementing light in the decorative lighting device according to an embodiment.

As shown in FIG. 6, the light guide plates 4S, 4M, and 4L disposed in the front-rear direction overlap each other when viewed from the front, and supplement each other with light. As a result, the brightness of the overlapping portions is higher than the brightness obtained with a single light guide plate 4, and a high brightness that could not be obtained with a single light guide plate 4 can therefore be obtained. Consequently, high brightness can be obtained and the presentation effect can be enhanced without having to increase the number of light sources provided to a single light guide plate 4.

Furthermore, since the light guide plates 4S, 4M, and 4L are disposed spaced apart, a presentation with a greater perspective effect in the front-rear direction can also be achieved by controlling each of the light guide plates 4S, 4M, and 4L. The case 2 is open not only on the front surface but also on the side surfaces, which allows the light guide plates 4 to be seen not only from the front but also from a diagonal direction and from the sides. When viewed obliquely, the light emitted from the end surfaces of the outer peripheral portions of the light guide plates 4 makes the outer shape of the light guide plates 4 appear as shining lines. When viewed from the side, the light emitted from the end faces of the outer peripheral portions of the light guide plates 4 facing the side surfaces forms shining lines whose width is the thickness of the light guide plates and whose length is the vertical dimension of the light guide plates.

Furthermore, the inner wall of the case 2 is equipped with a mirror unit 9, and the cover 3 is equipped with a half mirror unit 12. An infinity mirror is formed by the mirror unit 9 and the half mirror unit 12, which makes it possible to produce a light presentation with a greater sense of depth.

§ 2 Configuration Example

An embodiment of the present invention will be described below with reference to FIGS. 1 to 8.

1. Appearance of Game Machine

FIG. 1 is an oblique view of an example of a game machine 100 in which the decorative lighting device 1 according to this embodiment is installed. As shown in FIG. 1, the decorative lighting device 1 is attached to the left and right edge portions on the front side of the housing 101 of the game machine main body of the game machine 100, for example. The left and right edges on the front side of the housing 101 are provided with recesses into which the decorative lighting devices 1 are fitted. In this Specification, the left-right direction is the left-right direction when facing the front of the game machine 100.

2. Overview of Decorative Lighting Device 1

FIG. 2 is an oblique view of the decorative lighting device 1 according to this embodiment. The decorative lighting device 1 shown in FIG. 2 is attached to the edge portion on the left side of the game machine 100 (the left side when facing the machine) (see FIG. 1). As shown in FIG. 2, the decorative lighting device 1 of this embodiment has an elongated shape that is longer in the vertical direction. The decorative lighting device 1 comprises an elongated case 2 that is open on the front and side surfaces, an elongated transparent cover 3 that covers the open portion of the case 2, and a plurality of light guide plates 4.

The light guide plates 4 are disposed spaced apart in the front-rear direction (depth direction), with the light emitting surfaces 4*a* facing the front. In the example in FIG. 2, three light guide plates 4S, 4M, and 4L are disposed in the front-rear direction, and three sets, each of which is made up of three light guide plates 4S, 4M, and 4L, are disposed in the vertical direction. The shape and size of the light guide plates, the number of light guide plates disposed in the front-rear direction, and the number of sets consisting of a plurality of light guide plates and disposed in the vertical direction can be changed as needed by taking into account the dimension in the depth direction of the decorative lighting device, and the dimension in the vertical direction of the decorative lighting device.

The three light guide plates 4S, 4M, and 4L are formed in a substantially rectangular shape that is longer in the vertical direction, and the lengths are different in the vertical and horizontal directions. The three light guide plates 4S, 4M, and 4L are disposed so that the three light guide plates 4S, 4M, and 4L overlap each other when viewed from the front, and so that the size increases going from the front to the rear. More specifically, the light guide plate 4S having the shortest length in the vertical and horizontal directions is disposed in the first row (at the very front), the light guide plate 4M having an intermediate length in these two directions is disposed in the second row, and the light guide plate 4L having the longest length in these two directions is disposed in the third row at the deepest position. When these three light guide plates 4L, 4M, 4S are viewed from the front, the light guide plates 4M and 4L are disposed so become larger in steps in the vertical direction and the left direction, centered on the light guide plate 4S that is the smallest.

The case 2 comprises a mirror unit 9 having a light reflection function on the inner wall surface. The cover 3 comprises a half mirror unit 12 having a light reflection function and a light transmission function. The mirror unit 9 of the case 2 and the half mirror unit 12 of the cover 3 form an infinity mirror. Also, a plurality of inward-facing recesses 3*a* are formed in the cover 3.

In the drawings, the members indicated by reference numerals 7 and 8 are end covers that are fitted to the upper and lower end portions of the decorative lighting device 1. The decorative lighting device 1 attached to the right edge portion of the game machine 100 is configured to be in right and left symmetry with the decorative lighting device 1 shown in FIG. 2.

3. Configuration of Decorative Lighting Device 1

Figure 3:
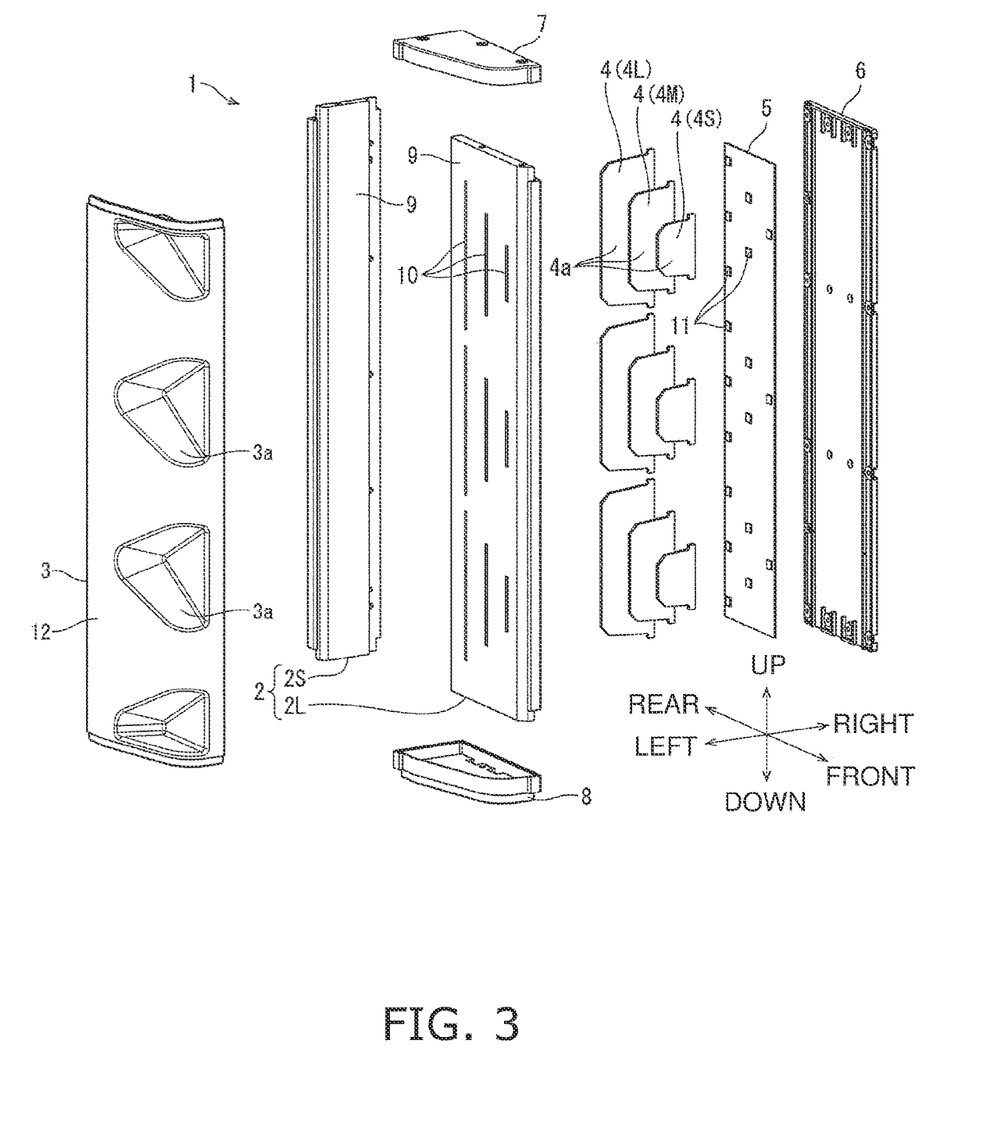
FIG. 3 is an exploded oblique view of the configuration of the decorative lighting device according to an embodiment.
Figure 4:
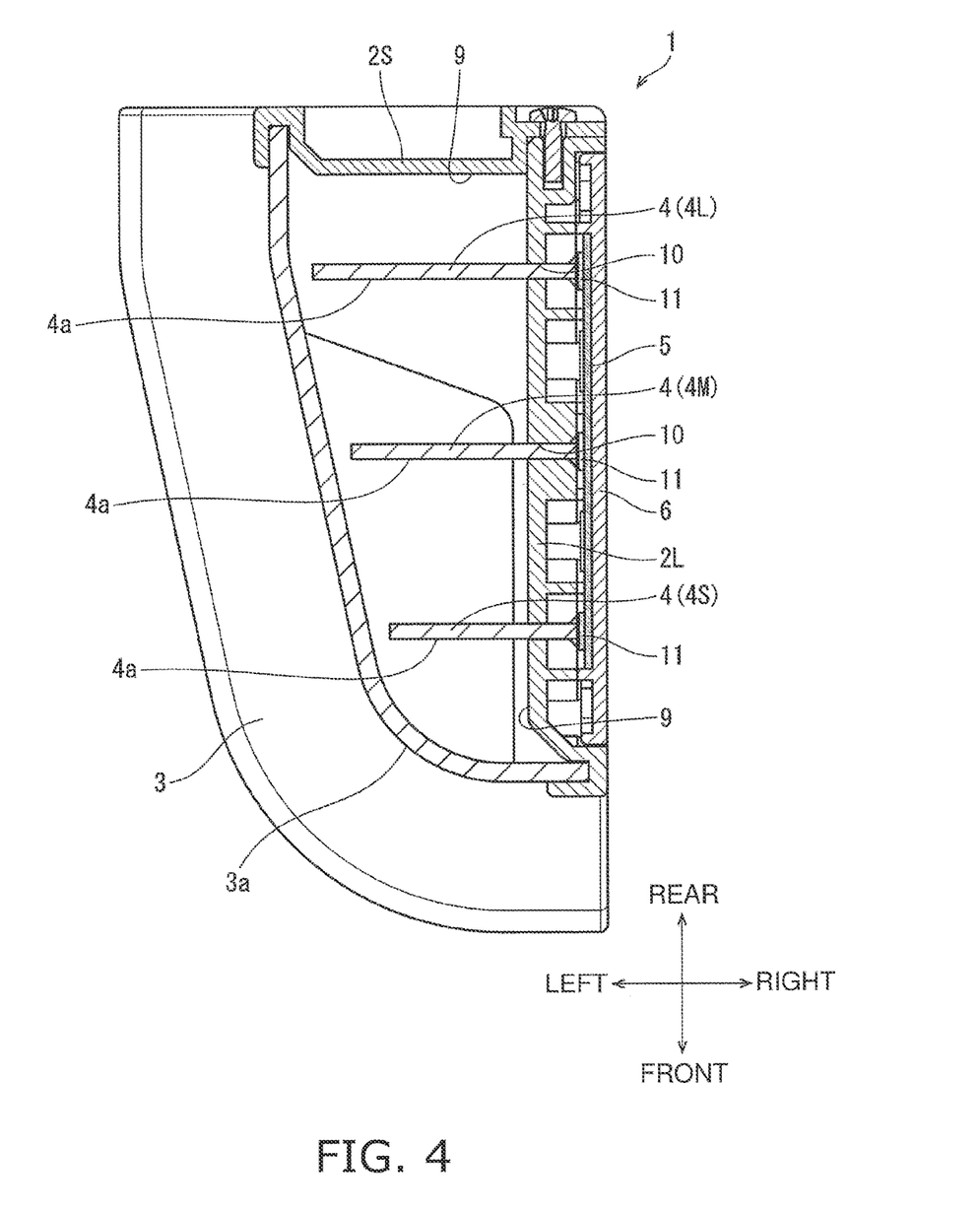
FIG. 4 is a lateral cross-sectional view of the decorative lighting device according to an embodiment.
Figure 5:
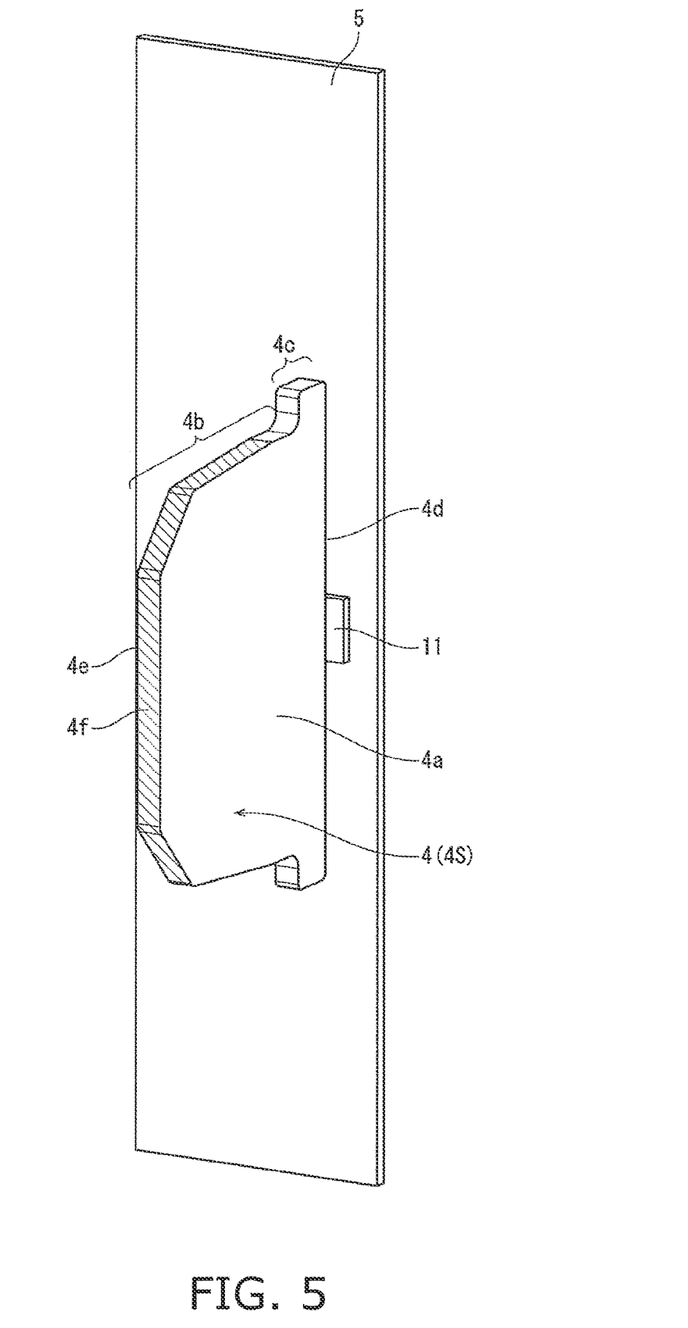
FIG. 5 is an oblique view of a light guide plate and an LED substrate in the decorative lighting device according to an embodiment.

FIG. 3 is an exploded oblique view of the configuration of the decorative lighting device 1 according to this embodiment. FIG. 4 is a lateral cross-sectional view of the decorative lighting device 1 according to this embodiment. FIG. 5 is an oblique view of a light guide plate 4 and an LED substrate 5 in the decorative lighting device 1 according to this embodiment.

As shown in FIGS. 3 and 4, the decorative lighting device 1 comprises an LED substrate 5 and a base 6 in addition to the case 2, the cover 3, the light guide plates 4, and the end covers 7 and 8 described above. The LED substrate 5 and the base 6 are formed in an elongated shape like the case 2 and the cover 3.

The case 2 supports the components that constitute the decorative lighting device 1. The case 2 comprises a small case portion 2S located on the back of the decorative lighting device 1 and a large case portion 2L located on the right side surface of the decorative lighting device 1. As mentioned above, the mirror unit 9 is provided on the inner wall surface of each of the small case portion 2S and the large case portion 2L (the wall surface that demarcates the space in which the light guide plates 4 are disposed). The mirror unit 9 is formed by vapor deposition, for example.

The large case portion 2L has slit-shaped fixing holes 10 for supporting the light guide plates 4. A plurality of these fixing holes 10 are formed corresponding to the attachment positions of the plurality of light guide plates 4, and are through-holes that go through the large case portion 2L in the thickness direction.

The LED substrate 5 comprises a plurality of LEDs (light sources) 11 disposed corresponding to the attachment positions of the light guide plates 4. The LEDs 11 are disposed opposite the end surfaces of the outer peripheral portions of the light guide plates 4 supported by the large case portion 2L. One LED 11 is provided to the light guide plate 4S, two to the light guide plate 4M, and three to the light guide plate 4L, according to the size of each light guide plate 4. The LED substrate 5 is held by the base 6 and is attached to the back side (outside) of the large case portion 2L.

The light guide plates 4 are made of transparent polycarbonate, acrylic resin, or the like. As shown in FIG. 5, the light guide plates 4 each have a main body portion 4*b* formed in the desired shape, and a base portion 4*c* that sticks out in the vertical direction from the main body portion 4*b*. The light guide plate 4 is inserted into a fixing hole 10 formed in the large case portion 2L, from the back side of the large case portion 2L, and is fixed in a state in which the base portion 4*c* is butted against the back surface of the large case portion 2L. The end surfaces of the outer peripheral portion opposite the LED 11 in the base portion 4*c* are the light incident surfaces 4*d*.

On the back surface 4*e* on the opposite side from the light emitting surface 4*a* of the light guide plate 4 are formed dimples (not shown), which are fine texturing for reflecting the light guided through the inside of the light guide plate 4 and emitting this light from the light emitting surface 4*a*. The dimples may be formed over the entire back surface 4*e* so as to illuminate the entire light guide plate 4, or may be formed in a design or pattern on just a part of the back surface 4*e*.

When the LED 11 is lit, the light of the LED 11 is guided from the light incident surface 4*d* to be incident in the interior of the light guide plate 4. Of the light guided through the interior, the light reflected by the dimples is emitted from the light emitting surface 4*a*. Consequently, the light emitting surface 4*a* emits light in the pattern formed by the dimples. Of the light guided through the interior, the light that reaches the outer peripheral end surface 4*f* without being reflected by the dimples is diffused and emitted from the outer peripheral end surface 4*f*. Consequently, the outer peripheral end surface 4f of the light guide plate 4 emits light, and the outline of the light guide plate 4 can be seen as a shining line.

4. Presentation Effect of Decorative Lighting Device 1

FIG. 6 is a diagram illustrating a presentation effect produced by supplementing light in the decorative lighting device 1 according to this embodiment. The part of the drawing labeled 601 is a diagram showing the line of sight of a player looking at the three light guide plates 4S, 4M, and 4L disposed in the front-rear direction, as seen from the front. The part of the drawing labeled 602 shows how the three light guide plates 4S, 4M, and 4L disposed in the front-rear direction look to the player when viewed from the front.

As shown by 602 in the drawing, the three light guide plates 4S, 4M, and 4L disposed in the front-rear direction appear to overlap each other when viewed from the front. As shown by 601 in the drawing, the three light guide plates 4S, 4M, and 4L supplement each other because they overlap. As a result, the brightness of the overlapping portions is higher than the brightness obtained by a single light guide plate 4, and a high brightness that could not be obtained with a single light guide plate 4 can be obtained.

In the three light guide plates 4S, 4M, and 4L, when the dimples are formed over the entire back surface 4e, the brightness of the light guide plate 4S, in which three plates are overlapping, appears the highest, while the brightness of light guide plate 4M, in which two plates are overlapping, looks the nest highest. Consequently, high brightness can be obtained and the presentation effect can be enhanced without having to increase the number of LEDs 11 provided to a single light guide plate 4.

The brightness of one light guide plate 4 when viewed from the front can be increased by setting the shape of the dimples so that the light emitted from the light emitting surface 4a travels toward the player located in front. Accordingly, the brightness when the three light guide plates 4S, 4M, and 4L are shown overlapping can be further increased by setting the shape of the dimples provided to the three light guide plates 4S, 4M, and 4L so that the light emitted from the light emitting surface 4a travels toward the player located in front.

Also, since the three light guide plates 4S, 4M, and 4L are disposed spaced apart, the three light guide plates 4S, 4M, and 4L are seen as being separated in the front-rear direction, as shown in the part of the drawing labeled 601. This creates a sense of depth in the longitudinal direction, and by controlling the three light guide plates 4S, 4M, and 4L, it is possible to produce a presentation effect with a sense of depth.

Also, the three light guide plates 4S, 4M, and 4L have different lengths in the vertical direction and the horizontal direction, and increase in size from the front to the rear. Consequently, as shown in the part of the drawing labeled 602, the three light guide plates 4S, 4M, and 4L can all be seen from the front, and the width of the effect is increased. In addition, the perspective method can be used to produce a presentation effect with a greater sense of depth. In this embodiment, the lengths of the three light guide plates 4S, 4M, and 4L were varied in the vertical direction and the horizontal direction, but the lengths may instead be varied in just the vertical direction or the horizontal direction, or the three light guide plates 4S, 4M, 4L may have similar shapes.

Also, as shown in the part of the drawing labeled 601, when the decorative lighting device 1 is viewed from the side, the three light guide plates 4S, 4M, and 4L can be seen as shining lines in which the thickness of each plate is the line width and the dimension in the vertical direction is the length of the line. Since the brightness of the outer peripheral end surface 4f seen as a shining straight line is higher than the brightness of the light emitting surface 4a, the shining straight lines can be seen very clearly.

Figure 7:
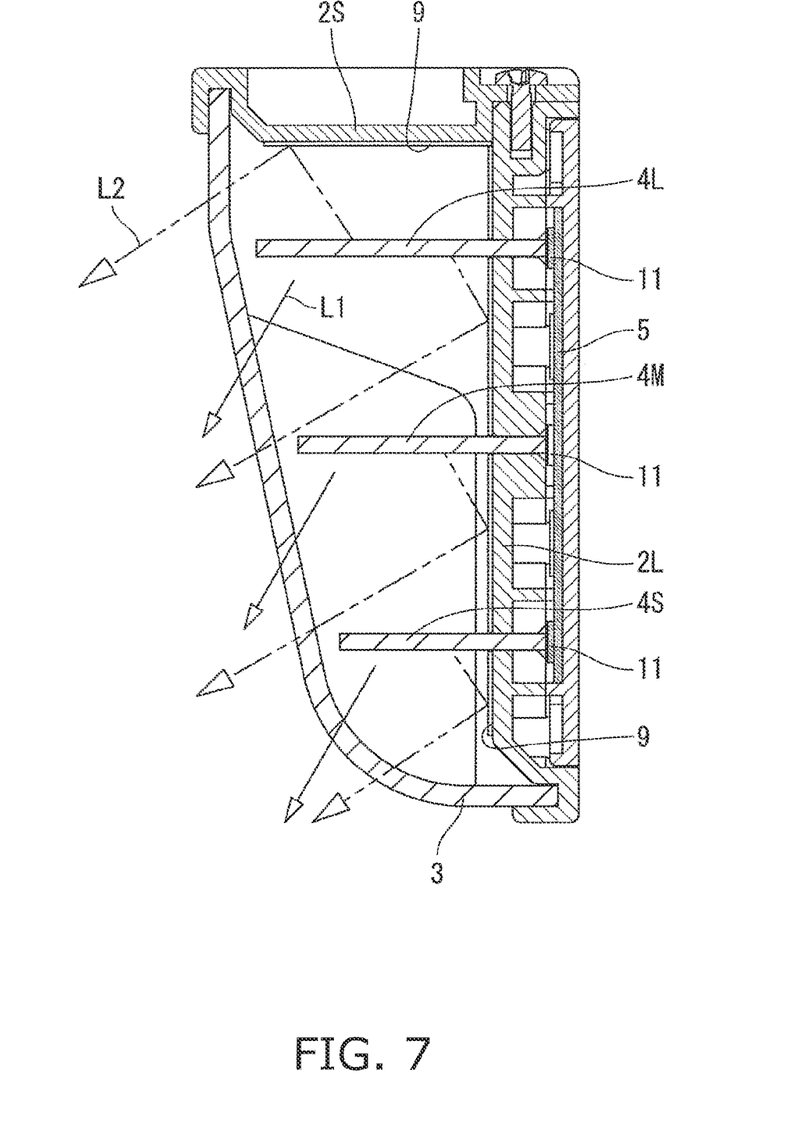
FIG. 7 is a lateral cross-sectional view illustrating the presentation effect produced by the mirror unit in the decorative lighting device according to an embodiment.

FIG. 7 is a lateral cross-sectional view illustrating a presentation effect produced by the mirror unit 9 in the decorative lighting device 1 according to this embodiment. The light emitted from the decorative lighting device 1 includes direct light L1 from the light guide plate 4 (indicated by thin, solid-line arrows) and reflected light L2 from the mirror unit 9 (indicated by thin, two-dot chain line arrows). The direct light L1 includes light traveling in the direction set by dimples from the light emitting surface 4a of the light guide plate 4, and diffused light emitted in many different directions from the outer peripheral end surface 4f of the light guide plate 4. The player and anyone located around the game machine 100 will see the direct light L1 coming from the light guide plate 4 and the reflected light L2 reflected by the mirror unit 9. Furthermore, in this embodiment, since the cover 3 is equipped with the half mirror unit 12, the player and anyone who is around the game machine 100 will also see light produced when some of the direct light L1 and the reflected light L2 is repeatedly reflected by the cover 3 and the mirror unit 9 (light produced by an infinity mirror). A sense of depth is created by this infinity mirror.

Figure 8:
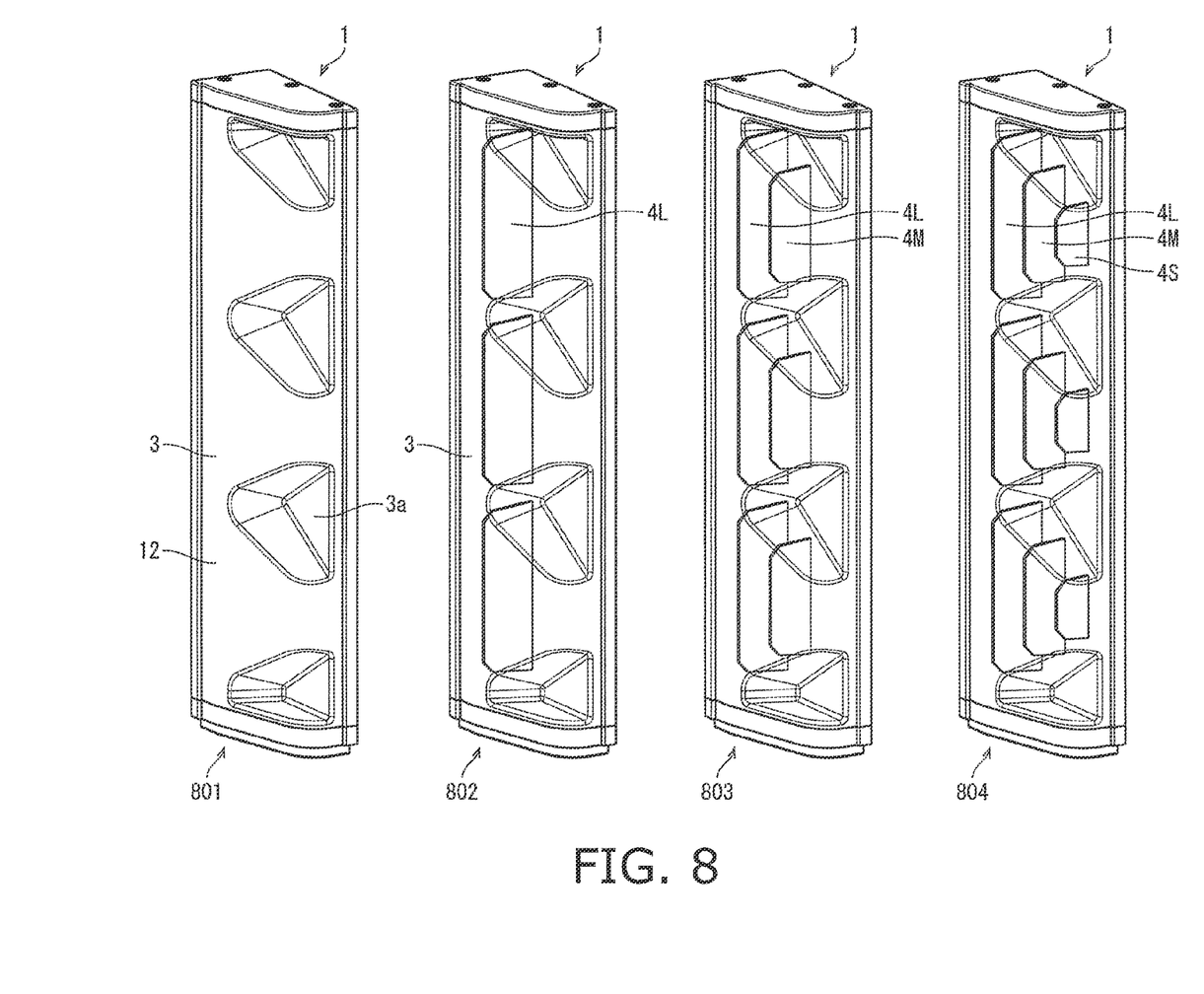
FIG. 8 is an oblique view illustrating a presentation example of the decorative lighting device according to an embodiment.

FIG. 8 is an oblique view illustrating a presentation example of the decorative lighting device 1 according to this embodiment. As shown by 801 in the drawing, when none of the light guide plates 4 is lit, the inside of the decorative lighting device 1 is dark, so the cover 3 looks like a mirror. Since the recesses 3a are provided, the images formed in the recesses 3a can be changed to pique the viewer's interest. When one or more light guide plates 4 are lit in this state, the surroundings of the lit light guide plates 4 become brighter, so that light passes through the cover 3 in this portion, and the lit light guide plates 4 become visible.

As shown by 802 to 804 in the drawing, when the three light guide plates 4S to 4L are lit in order starting from the light guide plates 4L located in the third row toward the front, a presentation can be given in which there appears to be movement toward the viewer, and the brightness gradually increases. Conversely, when the three light guide plates 4S to 4L are extinguished in order starting from the light guide plates 4S located in the first row, a presentation can be given in which there appears to be movement away from the viewer, and the brightness gradually decreases. In this way, each of the plurality of light guide plates 4 included in a set can be controlled to give a light presentation having a sense of depth and movement in the front-rear direction and varying brightness.

5. Other Effects (1) In the above configuration, in the plurality of light guide plates 4, the shape of the light guide plates 4, the thickness of the light guide plates 4, the surface area of the light guide plates 4, the spacing between the light guide plates 4, the design formed by the dimples, and so forth can be varied, which makes it simple to change the content of the presentation, and many different presentations are possible.

(2) By controlling the illumination colors of the plurality of light guide plates 4 disposed in the front-rear direction, it is possible to combine the illumination colors, and this also makes possible a wide range of presentations.

(3) Since the lit outer peripheral end surface 4f can be seen, so that the profile lines of the light guide plates 4 are visible as shining lines, a three-dimensional presentation can be created that combines the planar light of the plurality of light emitting surfaces 4a with the linear light of the plurality of outer peripheral end surfaces 4f.

(4) The shining lines produced by the lit outer peripheral end surfaces 4f can also be used as a means for transmitting some kind of information to the player or an employee of the gaming arcade. This will be described with reference to the drawings in a modification example.

§ 3 Modification Example

An embodiment of the present invention was described in detail above, but the description given so far is merely an example of the present invention in all respects. It should go without saying that various improvements and modifications are possible without departing from the scope of the present invention. For example, the following modifications can be made. In the following, those constituent elements that are the same as in the above embodiment will be numbered the same, and matters that are the same as in the above embodiment may be omitted. The following modification examples can be combined as appropriate.

<3.1>

In the above embodiment, a decorative lighting device that was longer in the vertical direction was given as an example of an elongated decorative lighting device incorporated in the housing of a game machine, but a plurality of sets made up of a plurality of light guide plates 4 that are disposed in the front-rear direction may be disposed in the left-right direction.

<3.2>

Figure 9:
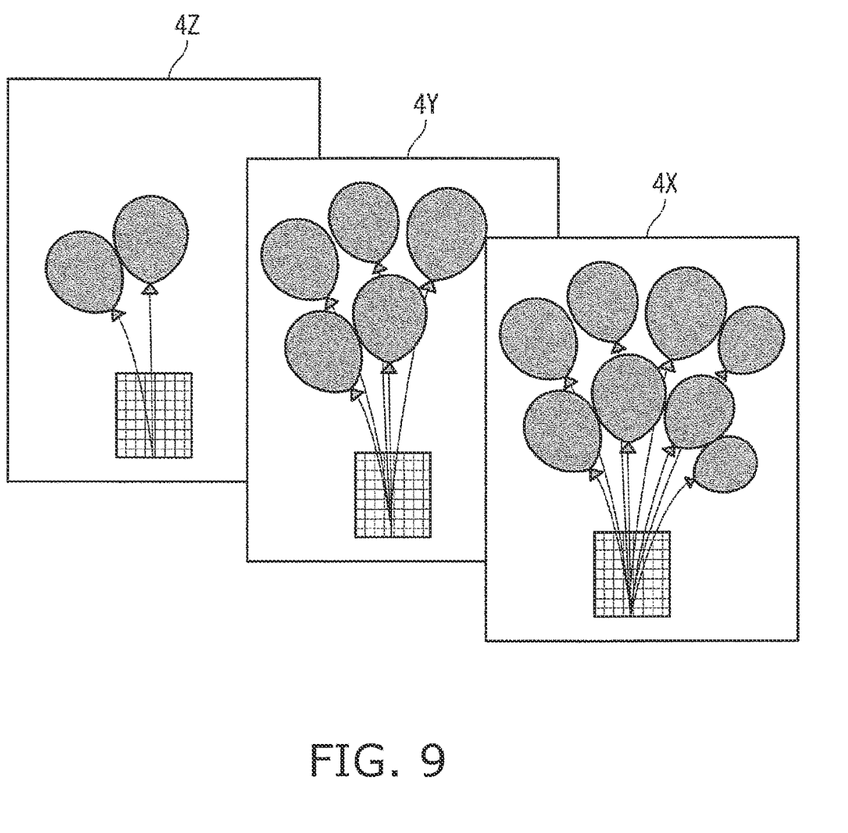
FIG. 9 is an explanatory diagram showing three light guide plates disposed in the front-rear direction in the decorative lighting device of a modification example.
Figure 10:
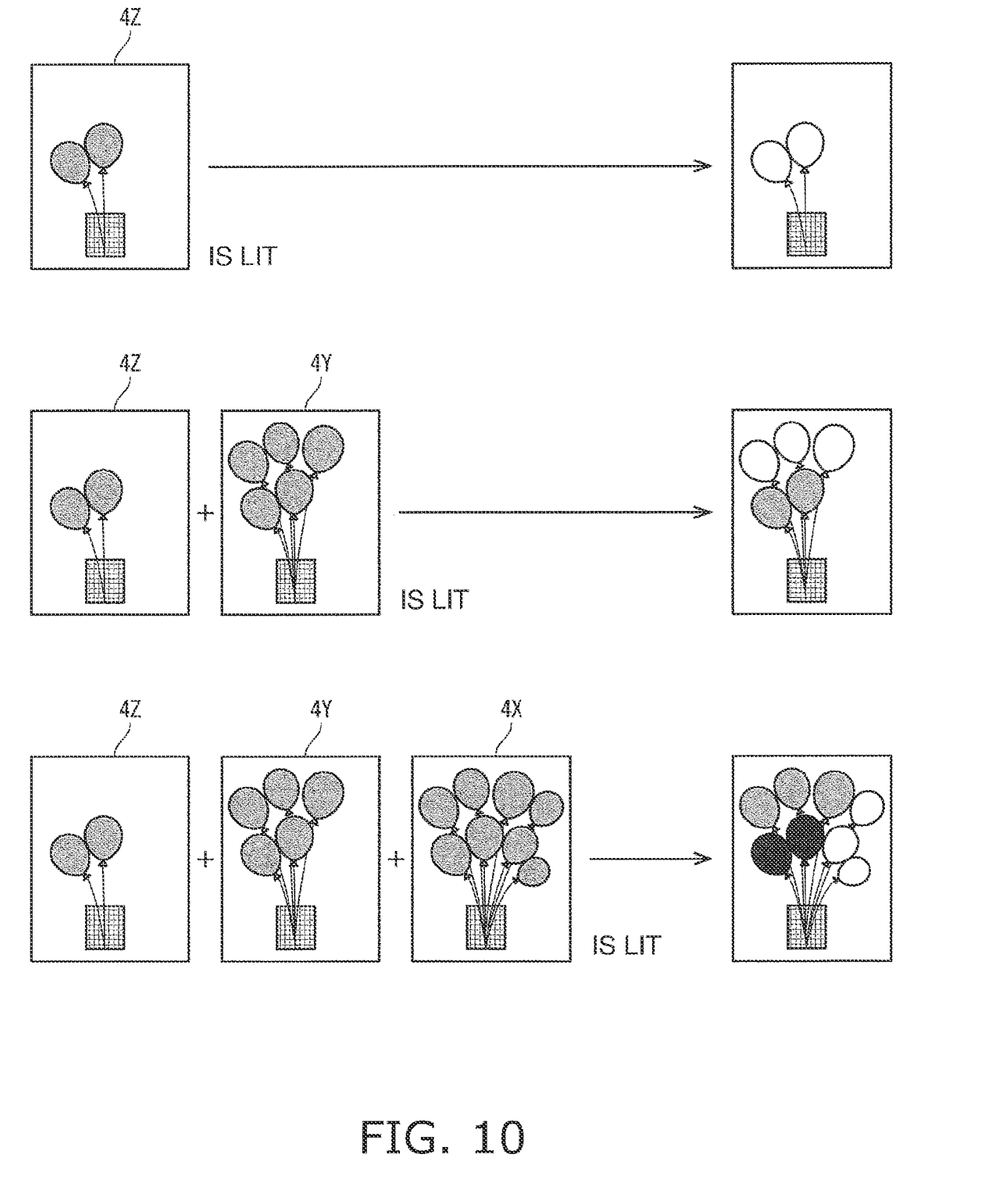
FIG. 10 is an explanatory diagram showing the lit state of the three light guide plates shown in FIG. 9, and how they are seen when viewed from the front.

The plurality of light guide plates 4 disposed in the front-rear direction may include light guide plates 4 having different external shapes, or may include light guide plates 4 having different patterns formed by dimples. FIG. 9 is an explanatory diagram showing three light guide plates 4X, 4Y, and 4Z disposed in the front-rear direction in the decorative lighting device of a modified example. FIG. 10 is an explanatory diagram showing the lit state of the three light guide plates 4X, 4Y, and 4Z shown in FIG. 9 and how they look when viewed from the front.

As shown in FIG. 9, a plurality of balloon designs are drawn with dimples on the three light guide plates 4X, 4Y, and 4Z. The first row has the most balloons, with eight, and there are five in the second row and two in the third row, with the number decreasing toward the rear.

As shown in FIG. 10, when viewed from the front in a state in which only the light guide plate 4Z in the third row are lit, the two balloons drawn on the light guide plate 4Z in the third row are visible. The brightness of the balloons at this point is the brightness of the one light guide plate 4Z.

When viewed from the front in a state in which the light guide plate 4Z in the third row and the light guide plate 4Y in the second row are lit, five balloons are visible. Of these, two of the balloons drawn on the two light guide plates 4Y and 4Z have higher brightness than the other three balloons due to the supplementation of light by the two light guide plates 4Y and 4Z.

When viewed from the front in a state in which the three light guide plates 4X, 4Y, and 4Z in the first to third rows are lit, eight balloons are visible. Of these, two of the balloons drawn on all three light guide plates 4X, 4Y, and 4Z have the highest brightness due to the supplementation of light by the three light guide plates 4X, 4Y, and 4Z. The brightness of three of the balloons drawn on the light guide plate 4Y in the second row and the light guide plate 4X in the first row is the next highest, and the brightness of the three balloons drawn only on the light guide plate 4X in the first row is the lowest.

By lighting the three light guide plates 4X to 4Z in order starting from the light guide plate 4Z located in the third row toward the front, a presentation can be given in which the number of balloons increases moving toward the front, and the brightness changes. By contrast, by turning off the three light guide plates 4X to 4Z in order starting from the light guide plate 4X located in the first row, a presentation can be given in which the number of balloons decreases moving toward the rear and the brightness changes.

<3.3>

Figure 11:
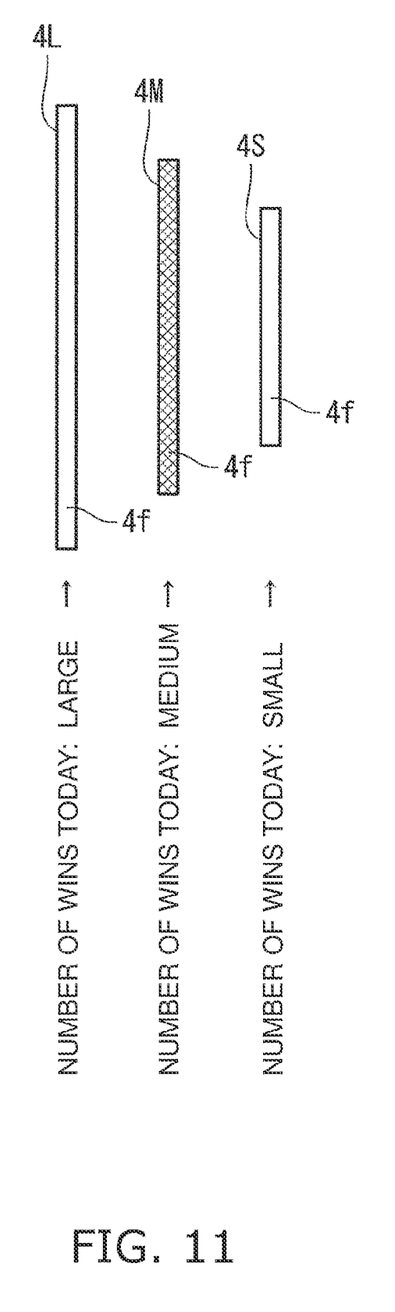
FIG. 11 shows a modification example, and is a diagram illustrating an example of a state in which shining straight lines produced by the lit outer peripheral end surfaces are used as a means for transmitting some kind of information to a player or an employee of a game arcade.

FIG. 11 is an explanatory diagram showing an example of a state in which the shining lines produced by the lit outer peripheral end surfaces 4f are used as a means for transmitting some kind of information to a player or an employee of the gaming arcade. In the example of FIG. 11, today's wins on the game machine 100 are shown by utilizing the length of the shining lines of the light guide plates 4S, 4M, and 4L, which are different sizes.

The light guide plate 4L having the longest shining line length is assigned to indicate a large number of wins, the light guide plate 4M having an intermediate shining line length is assigned to indicate a medium number of wins, and the light guide plate 4S having the shortest shining line length to indicate a small number of wins. The number of wins is divided into large, medium and small on the basis of predetermined threshold values, and one of the three light guide plates 4S, 4M, and 4L is lit according to how many wins there have been on the game machine 100. Large, medium and small are determined according to predetermined threshold values and the number of wins on the game machine 100 that day. The information that is transmitted is not limited to how many wins there have been that day, and may instead be, for example, how much money has gone into the machine, or how much has been paid out. Notification of this information may be performed at specific time intervals, such as every 5 minutes for 30 seconds.

<3.4>

The mirror unit 9 may be provided on the inner wall of either the small case portion 2S or the large case portion 2L, or may be partially provided. A wide variety of presentations can be created by varying the location where the mirror unit 9 is provided. Furthermore, the mirror unit 9 may be provided to the wall surfaces on the inside of the end covers 7 and 8.

The present invention is not limited to or by the above embodiments, and various modifications are possible within the scope of the claims, and embodiments obtained by appropriately combining the technical means disclosed in the different embodiments are also encompassed by the technical scope of the present invention.

REFERENCE SIGNS LIST 1 decorative lighting device
2 case
3 cover
4, 4S, 4M, 4L, 4X, 4Y, 4Z light guide plate
4a light emitting surface
4d light incident surface
4e back side
4f outer peripheral end surface
5 LED substrate
9 mirror unit
10 fixing hole
11 LED (light source)

12 half mirror unit
100 game machine
101 housing

The invention claimed is:

1. A decorative lighting device installed in a housing of a game machine, the device comprising:
   a case in which at least a front surface and a side surface of the device are open;
   a transparent cover that covers an open portion of the case;
   a plurality of light guide plates that are housed inside the case and are disposed spaced apart in a front-rear direction of the device, with each light emitting surface facing the front surface of the device; and
   a plurality of light sources provided corresponding to the plurality of light guide plates, wherein
   the plurality of light guide plates increase in size going from a front toward a rear.

2. A game machine, having:
   a game machine main body; and
   the decorative lighting device according to claim 1, which is installed in the housing of the game machine main body.

3. A decorative lighting device installed in a housing of a game machine, the device comprising:
   a case in which at least a front surface and a side surface of the device are open;
   a transparent cover that covers an open portion of the case;
   a plurality of light guide plates that are housed inside the case and are disposed spaced apart in a front-rear direction of the device, with each light emitting surface facing the front surface of the device; and
   a plurality of light sources provided corresponding to the plurality of light guide plates, wherein
   the case comprises a mirror unit having a light reflection function on an inner wall that demarcates a space in which the plurality of light guide plates are disposed.

4. The decorative lighting device according to claim 3, wherein
   the cover comprises a half mirror unit having a light reflection function and a light transmission function.

5. A game machine, having:
   a game machine main body; and
   the decorative lighting device according to claim 3, which is installed in the housing of the game machine main body.

6. A decorative lighting device installed in a housing of a game machine, the device comprising:
   a case in which at least a front surface and a side surface of the device are open;
   a transparent cover that covers an open portion of the case;
   a plurality of light guide plates that are housed inside the case and are disposed spaced apart in a front-rear direction of the device, with each light emitting surface facing the front surface of the device; and
   a plurality of light sources provided corresponding to the plurality of light guide plates, wherein
   the cover comprises a half mirror unit having a light reflection function and a light transmission function.

7. A game machine, having:
   a game machine main body; and
   the decorative lighting device according to claim 6, which is installed in the housing of the game machine main body.

* * * * *